United States Patent [19]

Mineck

[11] Patent Number: 4,553,306
[45] Date of Patent: Nov. 19, 1985

[54] RECIPROCATING SAW OFFSET BLADE HOLDER

[76] Inventor: Paul S. Mineck, 2953 Harrison St., San Francisco, Calif. 94110

[21] Appl. No.: 548,942

[22] Filed: Nov. 7, 1983

[51] Int. Cl.⁴ .................. B23P 17/00; B27B 11/06
[52] U.S. Cl. ................... 29/401.1; 30/392; 279/84
[58] Field of Search .............. 30/392, 393, 394; 279/9 A, 14, 83, 84; 29/401.1; 76/78 R; 145/108 B

[56] References Cited
U.S. PATENT DOCUMENTS 3,028,890  4/1962  Atkinson .................... 30/392 X
3,260,290  7/1966  Hoppe ........................ 30/392
3,412,767  11/1968 Green ......................... 30/392
3,542,097  11/1970 Dudek ........................ 30/392
3,547,166  12/1970 Dudek ........................ 30/392

Primary Examiner—Jimmy C. Peters
Attorney, Agent, or Firm—Schapp and Hatch

[57] ABSTRACT

A modification to an existing adapter for reciprocating sabesaws which supports the saw blade on the top of the adapter for making "flush with" cuts along the intersection between floors and walls, the improvement providing a second mounting for the saw blade clamping on the side of the adapter for making "flush to" cuts against a floor perpendicular to a wall with the cut ending at the wall.

3 Claims, 5 Drawing Figures

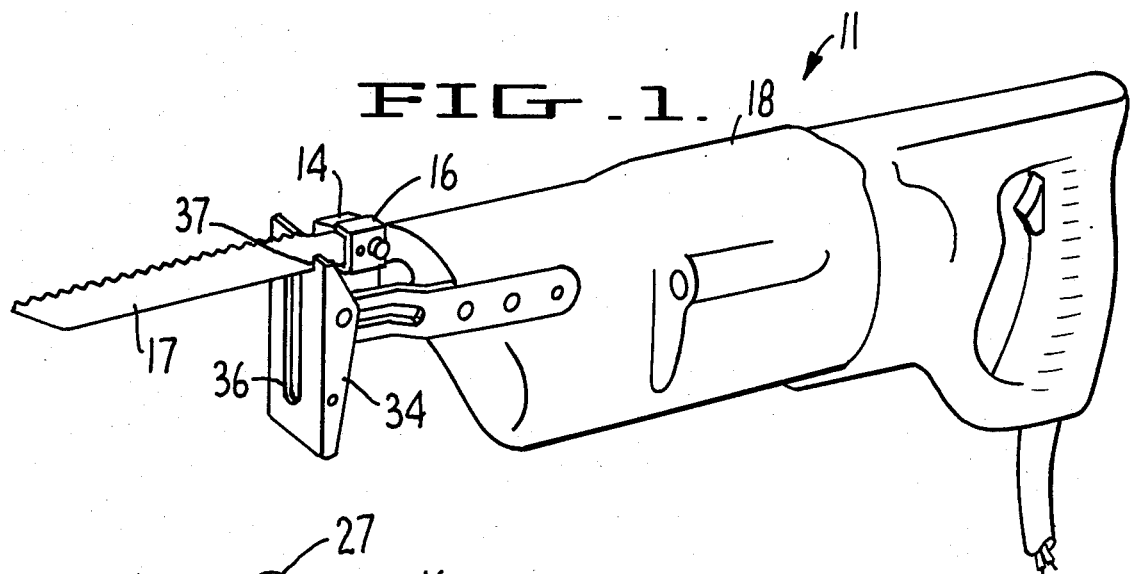
FIG. 1.
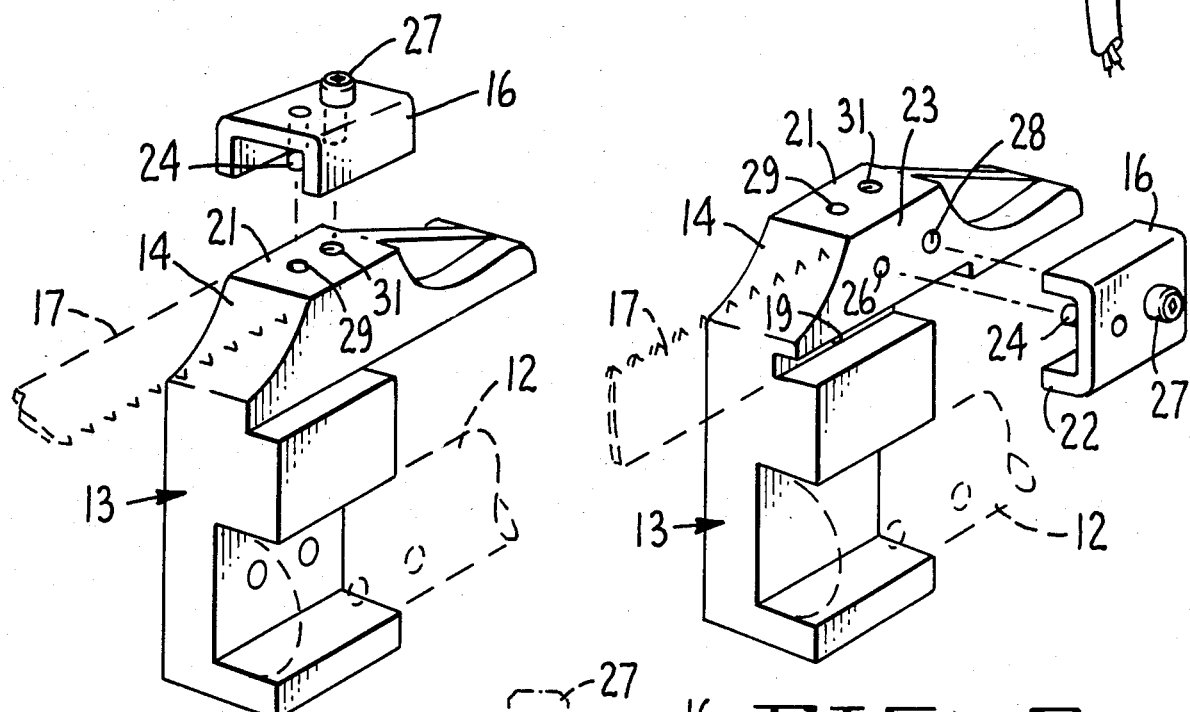
PRIOR ART
FIG. 2.
FIG. 3.
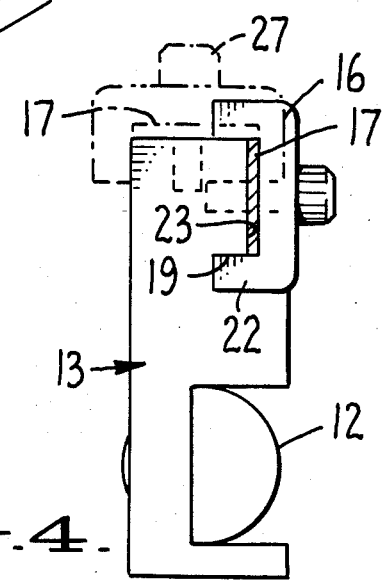
FIG. 4.
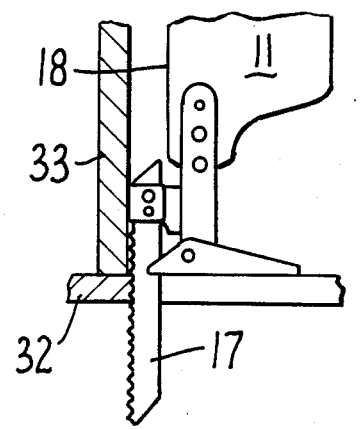
FIG. 5.

RECIPROCATING SAW OFFSET BLADE HOLDER

BACKGROUND OF THE INVENTION

1. Field of the Invention.

This invention relates to improvements in a reciprocating saw offset blade holder, and more particularly to adapters formed for supporting the reciprocatable saw blade in position for making desired cuts in a surface in close proximity to a perpendicular surface.

2. Description of the Prior Art.

Motor driven reciprocating blade hand saws have become widely used, particularly in the construction industry. These saws are used for rough cutting structural members such as studs and other framing timbers.

These hand held reciprocating saws conventionally have a reciprocating spindle driven by the motor to which the saw blade is removably attached, with the saw blade acting as an extension of the spindle. While these saws function extremely well for rough cutting, they do not function as well for refined cuts such as would be made by furnace installers or plumbers. In making these refined cuts, it is necessary for the saw to be able to make a cut in a flat surface (such as a floor) along the juncture of such flat surface with a perpendicular flat surface (such as a wall). This kind of cut is known in the trade as a "flush with" cut.

In making the described refined cuts, it is also necessary to make a cut in a flat surface (floor or wall) at right angles to and up flush against a perpendicular surface (wall or floor). This type of cut is known in the trade as a "flush to".

One of the reciprocating blade saws most used in the construction industry is manufactured by the Milwaukee Electric Tool Corporation of Brookfield, Wis. As sold, the Milwaukee reciprocating saw (called "Sawzall") is not capable of making either "flush to" or "flush with" cuts without modification. Milwaukee also markets a device called "Offset Blade Adapter, catalog number 48-03-2000" which renders the Milwaukee reciprocating blade saw capable of making "flush with" cuts. Tha adapter fastens to the motor driven reciprocating spindle to which the blade is normally attached, and the blade is secured to the flat top of the adapter in such a manner that the plane of the blade is offset above the top of the housing for the motor. This makes it possible to saw along the juncture between perpendicular surfaces, parallel to one of the surfaces, thus making a "flush with" cut.

The described offset blade adapter, however, does not make it possible to use the blade to make a "flush to" cut, that is, a cut through a first surface perpendicular to a second surface in which the cut is perpendicular to the second surface and terminates thereat.

SUMMARY OF THE INVENTION

The present invention is directed to an improvement modification of the Milwaukee Electric Tool Corporation Offset Blade Adapter for Milwaukee Sawzalls which make it possible to mount the saw blade on the adapter in position for making "flush to" cuts. This is accomplished by providing grooves and tapped holes in the Milwaukee Offset Blade Adapter in such manner that the saw blade securing clip furnished with the Milwaukee Offset Blade Adapter can be used to clamp the saw blade to the adapter with the plane of the blade vertical and the teeth of the blade extending upwardly beyond the level of the top of the housing for accomplishing the "flush to" cut. Thus, the adapter may be used for both "flush with" and "flush to" cuts without additional parts.

It is therefore an object of the present invention to provide a modification to an offset blade adapter for reciprocating blade saws which provide for mounting the saw blade selectively in either a position for effecting "flush with" cuts or a position for effecting "flush to" cuts.

Another object of the present invention is to provide an offset blade adapter of the character described in which the saw blade is readily and easily moved between its "flush with" and "flush to" mounting positions on the adapter.

A further object of the present invention is to provide a modified offset blade adapter of the type used on Milwaukee Sawzalls in which the modification is accomplished by the provision of a groove and two holes in the side of the adapter, the modification requiring no parts in addition to those provided with the unmodified adapter.

Other objects and features of advantage will become apparent as the specification progresses and from the claims.

BRIEF DESCRIPTION OF THE DRAWINGS

FIG. 1 is a perspective view of a reciprocating saw offset blade holder modified in accordance with the present invention and mounted on a reciprocating saw unit.

FIG. 2 is an exploded perspective view of the unmodified offset blade adapter as supplied by the Milwaukee Electric Tool Corporation, illustrating the manner of securing the saw blade in position for making a "flush with" cut.

FIG. 3 is a view similar to that of FIG. 2, but showing the adapter modified in accordance with the present invention, and illustrating the manner of mounting the saw blade for making "flush to" cuts.

FIG. 4 is an end view of the modified offset blade adapter of FIG. 3.

FIG. 5 is a partial side elevational view of the modified offset blade adapter of the present invention mounted on a reciprocating saw, with the blade making a "flush to" cut.

While only the preferred form of the invention is illustrated in the drawings, it will be apparent that certain modifications could be made without departing from the ambit of the claims.

DESCRIPTION OF THE PREFERRED EMBODIMENTS

As may be seen in the accompanying drawing, the reciprocating saw offset blade adapter of the present invention is adapted for use with a hand held power driven saw 11 having a reciprocating drive member 12 and an adapter unit 13 mountable on the drive member 12 and having an offset portion 14 extending laterally from the drive member 12, the adapter unit being provided with a U-shaped clip 16 formed for securing the end of a saw blade 17 with the plane of the blade substantially flat with the upper surface 18 of the hand held reciprocating saw 11.

In accordance with the present invention, the adapter 13 is modified by forming a groove 19 parallel to the top, flat surface 21 of adapter 13, the groove being spaced below surface 21 by a distance sufficient to receive a flange 22 of the clip 16 so that the clip may be mounted in the manner shown in solid lines in FIG. 4 of the drawings. As there shown, the saw blade 17 has its rear end positioned flat against the surface 23 between upper face 21 and the groove 19, the saw blade being held in this position by clip 16, with this position of saw blade 17 providing the "flush to" cut.

Clip 16 is held in the position shown in FIG. 4 of the drawings by a pin 24 registering in a hole 26 formed in face 23, and a manually operable screw 27 threadably engageable in a tapped hole 28 formed in face 23.

Clip 16 is not modified and comes from the factory provided with the registration pin 24 and the manually operable machine screw 27. Thus, the clip 16 may be used to mount the saw blade 17 in position for making "flush with" cuts in the manner shown in FIG. 2 of the drawings wherein the pin 24 engages in registering opening 29 and the manually operable machine screw 27 is threadably engageable in a tapped opening 31, with the openings 29 and 31 already being provided in the unmodified adapter. This positioning of the saw blade 17 is indicated in phantom lines in FIG. 4 of the drawing.

As illustrated in FIG. 5, with the saw blade 17 mounted in the position shown in solid lines in FIG. 4 of the drawings, the operator can make a "flush to" cut through, for example, a floor 32 right up to a wall 33.

The saw unit 11 is normally provided with a spacer guard 34 having a slot 36 through which the saw blade 17 extends when the unit is in its normal operating mode with the saw blade 17 secured directly to the spindle 12. When it is desired to utilize the offset adapter 13, the saw blade 17 is removed from spindle 12 and the adapter 13 is mounted on spindle 12 in the manner best seen in FIG. 4 of the drawing.

When the saw blade 17 is mounted in position for making "flush to" cuts, as illustrated in FIG. 1 of the drawings, the upper end of spacer guard 34 would interfere with the lower edge of saw blade 17. To avoid this problem, a notch 37 is provided in spacer guard 34.

From the foregoing, it will be apparent that the reciprocating saw offset blade holder modifications of the present invention improve the versatility of a reciprocating blade saw of the character described by making it possible for the saw to be used for making "flush to" cuts as well as for making "flush with" cuts.

I claim:

1. In a hand held power drive saw unit having a reciprocating drive member and an adapter unit mountable on said drive member and having an offset portion extending laterally from the drive member and providing a U-shaped clip attachable to said offset portion by a machine screw and formed for securing the end of a saw blade to said offset portion with the saw blade substantially flat with the upper surface of the saw unit, the improvement comprising forming a groove in a side of said offset portion extending longitudinally of the drive member and adapter to receive one leg of said clip with said clip holding said saw blade against said side of said offset portion and with the teeth of said saw blade aligned with and projecting upwardly past the upper surface of the hand held power drive saw unit whereby said saw blade may be used to make "flush to" cuts, and drilling and tapping an opening in said side of said offset portion for threadably receiving said machine screw when said saw blade is in position for said "flush to" cuts.

2. The improvement described in claim 1 and wherein said machine screw is formed for both selectively securing said clip on top of said offset portion with said blade flat thereon for making "flush with" cuts and on the side of said offset portion with said blade against such side for making "flush to" cuts 3. An adapter as described in claim 2, and wherein the upper face of said offset portion is drilled and tapped, said U-shaped clip is formed with an opening through the web of the U, said machine screw is threadably engageable with the drilled and tapped part of said offset portion for clamping the end of a saw blade between said clip and said upper face of said offset portion with the saw blade in position for "flush with" cuts, and said side of said offset portion is drilled and tapped for threadably receiving said machine screw passing through the web of said clip for clamping the end of a saw blade between said clip and said side of said offset portion in position for "flush to" cuts.

* * * * *